(12) United States Patent
Ikai et al.

(10) Patent No.: US 10,352,269 B2
(45) Date of Patent: Jul. 16, 2019

(54) METHOD OF PRODUCING PISTON FOR ENGINE

(71) Applicant: MAZDA MOTOR CORPORATION, Aki-gun, Hiroshima (JP)

(72) Inventors: Takashi Ikai, Higashihiroshima (JP); Kouichi Nakano, Hiroshima (JP); Yoshiyuki Koga, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 103 days.

(21) Appl. No.: 15/515,061

(22) PCT Filed: Sep. 26, 2016

(86) PCT No.: PCT/JP2016/078228
§ 371 (c)(1),
(2) Date: Mar. 28, 2017

(87) PCT Pub. No.: WO2017/057251
PCT Pub. Date: Apr. 6, 2017

(65) Prior Publication Data
US 2017/0328301 A1    Nov. 16, 2017

(30) Foreign Application Priority Data

Sep. 30, 2015  (JP) .................................. 2015-194494

(51) Int. Cl.
*B32B 27/00*    (2006.01)
*F02F 3/12*    (2006.01)
(Continued)

(52) U.S. Cl.
CPC ................ *F02F 3/12* (2013.01); *B32B 37/06* (2013.01); *B32B 37/08* (2013.01); *B32B 37/10* (2013.01);
(Continued)

(58) Field of Classification Search
CPC ......... B65B 3/022; B65B 3/14; B65B 31/022; B65B 31/025; B29C 49/24; B29C 49/28;
(Continued)

(56) References Cited

U.S. PATENT DOCUMENTS

2009/0188481 A1\* 7/2009 Zhu ..................... F02B 23/0621
                                                                         123/661
2012/0180749 A1\* 7/2012 Kopchick .................. F16J 1/01
                                                                          123/193.6

FOREIGN PATENT DOCUMENTS

JP        2011169232 A      9/2011
JP           201440819 A      3/2014
JP        2014040819 A  \*  3/2014

OTHER PUBLICATIONS

ISA Japan Patent Office, International Search Report Issued in Japanese Application No. PCT/JP2016/078228, dated Nov. 29, 2016, WIPO, 2 pages.

\* cited by examiner

*Primary Examiner* — William P Bell
*Assistant Examiner* — Andrew L Swanson
(74) *Attorney, Agent, or Firm* — Alleman Hall Creasman & Tuttle LLP

(57) ABSTRACT

An object of the present invention is to, while forming a heat insulating layer on a squish area surface of a top surface of a piston main body, prevent generation of large cracks on the heat insulating layer and suppress damages and peeling of the heat insulating layer. To achieve this object, in the present invention, pressure is applied to a heat insulating layer provided on a top surface of a piston main body, that is, a pressing stress is applied to the heat insulating layer in advance.

9 Claims, 5 Drawing Sheets

(51) Int. Cl.
  *F02F 3/00*  (2006.01)
  *F02F 3/14*  (2006.01)
  *F02F 3/26*  (2006.01)
  *F16J 1/01*  (2006.01)
  *B32B 37/06*  (2006.01)
  *B32B 37/08*  (2006.01)
  *B32B 37/10*  (2006.01)

(52) U.S. Cl.
  CPC ............... *F02F 3/00* (2013.01); *F02F 3/14* (2013.01); *F02F 3/26* (2013.01); *F16J 1/01* (2013.01); *B32B 2307/304* (2013.01); *F02F 2200/00* (2013.01)

(58) Field of Classification Search
  CPC ..... B29C 49/4273; B29C 49/62; B29C 49/06; B29C 49/12; B29C 49/783; B29C 2049/4664; B29C 2049/4697; B29C 2049/627; B29C 2791/006; B29L 2031/7158; F02F 3/10; F02F 3/12
  See application file for complete search history.

METHOD OF PRODUCING PISTON FOR ENGINE

TECHNICAL FIELD

The present invention relates to a method of producing a piston for an engine.

BACKGROUND ART

Conventionally, in the case of a metal product, such as an engine part, which is subjected to a high-temperature gas, a heat insulating layer is formed on a surface of a metal base material of the metal product to suppress heat transfer from the high-temperature gas to the metal product, that is, to suppress a cooling loss of the metal product. One known example is that a heat insulating layer made of an inorganic oxide (such as zirconia) or an organic material containing hollow particles is formed on a top surface of a piston main body that defines a combustion chamber of an engine.

A squish area may be formed at a gap portion between the top surface of the piston main body that defines the combustion chamber and a lower surface of a cylinder head. In a case where the heat insulating layer is provided on a surface (squish area surface), where the squish area is formed, of the top surface of the piston main body, the heat insulating layer becomes high in temperature, and therefore, the squish area surface itself becomes high in temperature. On this account, when a high temperature and high pressure end gas (an uncombusted air-fuel mixture existing far from a spark plug) flows to the squish area in a combustion process, heat radiation from the end gas to the squish area surface is inhibited by the high temperature squish area surface, and this may cause knocking. Then, cracks are generated on the heat insulating layer formed on the squish area surface, and this causes damages and peeling of the heat insulating layer. Thus, a heat insulation property of the heat insulating layer is lost.

Some references (see PTL 1, for example) describe an internal combustion engine in which the heat insulating layer is not formed on the squish area surface of the top surface of the piston main body, and the heat insulating layer is formed only on the other portion of the top surface of the piston main body.

According to the internal combustion engine of PTL 1, since the heat insulating layer is not formed on the squish area surface, the heat radiation from the end gas to the squish area surface is promoted, and the generation of the knocking is suppressed.

CITATION LIST

Patent Literature

PTL 1: Japanese Laid-Open Patent Application Publication No. 2011-169232

SUMMARY OF INVENTION

Technical Problem

According to the configuration of PTL 1, the generation of the knocking in the squish area can be suppressed. However, from the viewpoint of a reduction in the cooling loss, it is desirable that the heat insulating layer be formed on the entire top surface, including the squish area surface, of the piston main body.

An object of the present invention is to, while forming a heat insulating layer on a squish area surface, prevent generation of large cracks on the heat insulating layer by generation of knocking, and suppress damages and peeling of the heat insulating layer.

Solution to Problem

To achieve the above object, in the present invention, pressure is applied to the heat insulating layer provided on the top surface of the piston main body, that is, a pressing stress is applied in advance to the heat insulating layer.

To be specific, a method of producing a piston for an engine disclosed herein is a method of producing a piston for an engine, a heat insulating layer being provided on a top surface of a piston main body of the piston, wherein the heat insulating layer includes: a large number of hollow particles; and a binder that holds the hollow particles on the top surface of the piston main body and fills spaces among the hollow particles to form a base material of the heat insulating layer, the method comprising: a heat insulating layer forming step of placing a heat insulating material including the hollow particles and the binder on the top surface of the piston main body to form the heat insulating layer; and a pressure applying step of applying pressure to the heat insulating layer.

According to the present invention, by applying the pressing stress in advance to the heat insulating layer provided on the top surface of the piston main body, resistance of the heat insulating layer to a tensile stress can be increased. Further, even when knocking occurs, generation of cracks on the heat insulating layer can be suppressed.

It is preferable that: the top surface of the piston main body include a squish area surface forming a squish area; and in the pressure applying step, the pressure be applied only to the heat insulating layer provided on the squish area surface. The knocking tends to occur in the squish area, and the cracks tend to be generated on the heat insulating layer formed on the squish area surface. According to the present configuration, the generation of the cracks on the heat insulating layer formed on the squish area surface can be effectively suppressed.

It is preferable that the squish area surface be a flat surface. With this, the pressure application can be easily performed.

It is preferable that in the pressure applying step, baking of the heat insulating layer be performed at the same time when the pressure is applied to the heat insulating layer. With this, the strength of the heat insulating layer can be improved, and the generation of the cracks can be effectively suppressed.

It is preferable that: the binder be silicone-based resin; and the silicone-based resin of at least a part of a surface of the heat insulating layer be oxidized by the baking. With this, the strength of the heat insulating layer can be improved, and the generation of the cracks can be effectively suppressed.

It is preferable that in the pressure applying step, cooling of the piston main body be performed at the same time as the baking. With this, by cooling the piston main body during the pressure application and baking of the heat insulating layer, adhesion between the heat insulating layer and the top surface of the piston main body can be improved.

Advantageous Effects of Invention

As described above, according to the present invention, by applying the pressing stress in advance to the heat insulating layer provided on the squish area surface, the resistance of the heat insulating layer to the tensile stress can be increased. Further, even when the knocking occurs at the squish area, the generation of the cracks on the heat insulating layer on the squish area surface can be suppressed.

DESCRIPTION OF EMBODIMENTS

Hereinafter, embodiments of the present invention will be explained in detail based on the drawings. Explanations of preferred embodiments below are essentially mere examples, and are not intended to limit the present invention, the application of the present invention, or the use of the present invention.

Embodiment 1

Configuration of Engine

Figure 1:
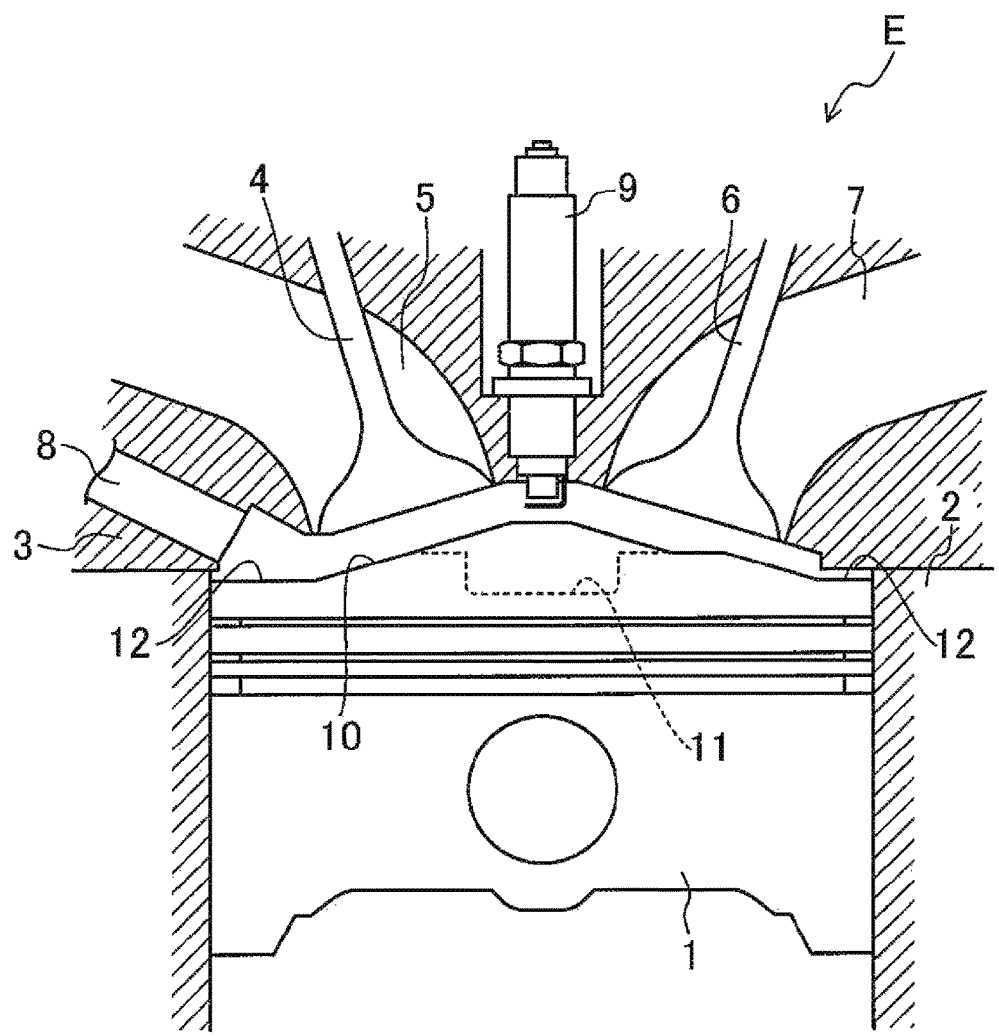
FIG. 1 is a sectional view schematically showing an engine including a piston produced by a method according to one embodiment of the present invention.

A direct injection engine E shown in FIG. 1 includes: a piston 1; a cylinder block 2; a cylinder head 3; an intake valve 4 configured to open and close an intake port 5 of the cylinder head 3; an exhaust valve 6 configured to open and close an exhaust port 7 of the cylinder head 3; an injector 8; and a spark plug 9. The piston 1 reciprocates in a cylinder bore of the cylinder block 2.

Figure 2:
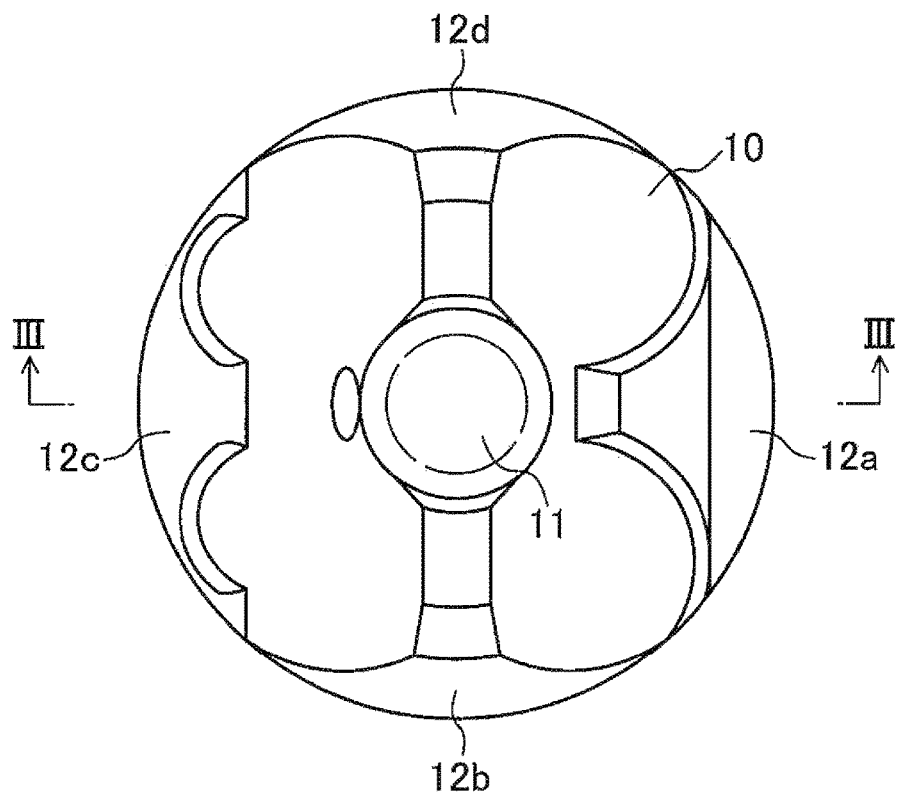
FIG. 2 is a plan view showing a crown surface of the piston according to the embodiment of FIG. 1.

A combustion chamber of the engine is formed by: a crown surface 10 of the piston 1; the cylinder block 2; the cylinder head 3; and umbrella portion front surfaces (surfaces facing the combustion chamber) of the intake and exhaust valves 4 and 6. As shown in FIGS. 1 and 2, a recessed cavity portion 11 forming a cavity of the combustion chamber is provided at a substantially middle portion of the crown surface 10 of the piston 1. A squish area portion 12 which forms a squish area exists at an outer edge side of the crown surface 10 which side is located away from the cavity of the combustion chamber. In the crown surface 10 of the piston 1 according to the present embodiment, the squish area portion 12 is formed by squish area portions 12a, 12b, 12c, and 12d.

Heat Insulating Layer

Figure 3:
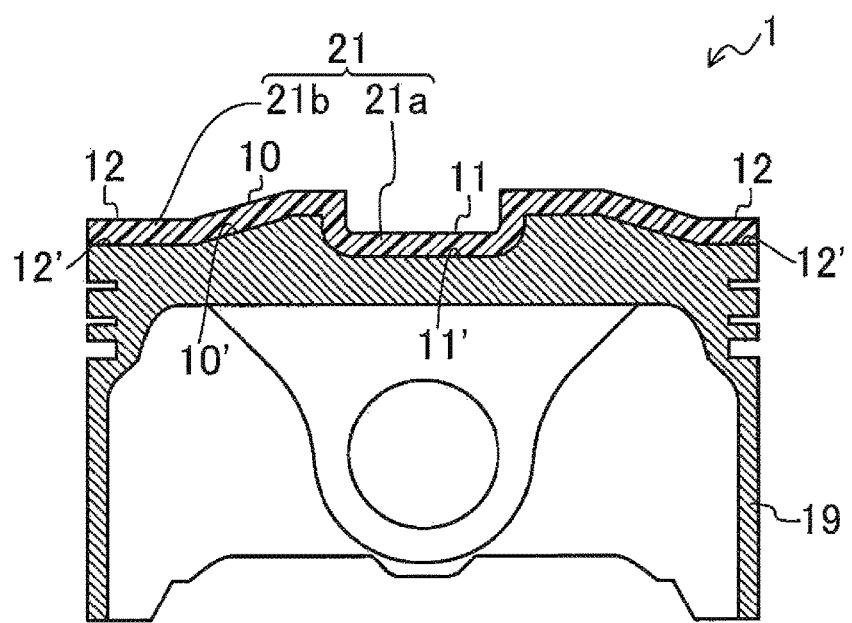
FIG. 3 is a longitudinal sectional view showing the piston of FIG. 2.

As shown in FIG. 3, the piston 1 includes: a piston main body 19 that is a base member of the piston 1; and a heat insulating layer 21 provided on a top surface of the piston main body 19 from the viewpoint of a reduction in cooling loss of the combustion chamber of the engine E.

The piston main body 19 is made of an aluminum alloy subjected to a T7 treatment or a T6 treatment. The top surface of the piston main body 19 includes: a cavity surface 11' constituting the cavity portion 11; and a squish area surface 12' constituting the squish area portion 12.

Figure 4:
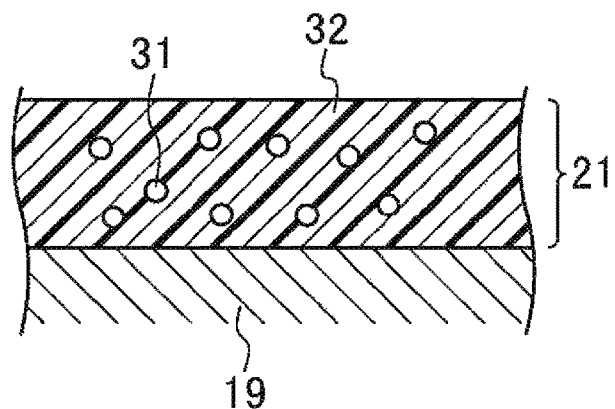
FIG. 4 is an enlarged sectional view showing a heat insulating layer of FIG. 3.

As shown in FIG. 4, the heat insulating layer 21 is a layer including hollow particles 31 and a binder material (binder) 32.

To be specific, the heat insulating layer 21 includes the binder material 32 and a large number of hollow particles 31 dispersed in the binder material 32. The binder material 32 holds the hollow particles 31 on the top surface of the piston main body 19 and fills spaces among the hollow particles 31 to form a base material of the heat insulating layer 21. The binder material 32 is, for example, a low thermally-conductive material, such as silicone-based resin, and internal spaces of the hollow particles 31 contain air that is low in thermal conductivity. Therefore, the heat insulating layer 21 is a layer having low thermal conductivity.

As the hollow particles 31, it is preferable to adopt ceramic-based hollow particles containing a Si-based oxide component (such as silica ($SiO_2$)) or an Al-based oxide component (such as alumina ($Al_2O_3$)), and examples thereof include silica balloons, glass balloons, shirasu balloons, fly ash balloons, and aerogel balloons. Especially, it is preferable to adopt glass balloons. Thus, the thermal conductivity of the heat insulating layer 21 can be reduced, and the strength of the heat insulating layer 21 can be improved.

The hollow particles 31 are preferably spherical. From the viewpoint of the improvement of the heat insulating property of the heat insulating layer 21, a mean diameter of the hollow particles 31 is preferably 5 μm or more and 50 μm or less, more preferably 10 μm or more and 45 μm or less, and especially preferably 15 μm or more and 40 μm or less. From the viewpoint of the improvement of the heat insulating property of the heat insulating layer 21, the amount of hollow particles 31 contained in the heat insulating layer 21 is preferably 5 mass % or more and 50 mass % or less, more preferably 10 mass % or more and 45 mass % or less, and especially preferably 15 mass % or more and 40 mass % or less.

Silicone-based resin that is a low thermally-conductive material can be used as the binder material 32. For example, silicone-based resin constituted by three dimensional polymer having high branching degree can be preferably used, and typical examples thereof include methyl silicone resin and methyl phenyl silicone resin. One specific example of the silicone-based resin is polyalkylphenylsiloxane. With this, the thermal conductivity of the heat insulating layer 21 can be reduced, and excellent adhesion between the top surface of the piston main body 19 and the heat insulating layer 21 can be realized.

From the viewpoint of obtaining the excellent heat insulation property, the thickness of the heat insulating layer 21 is preferably 50 μm or more and 150 μm or less, more preferably 60 μm or more and 120 μm or less, and especially preferably 60 μm or more and 100 μm or less.

Further, the thickness of the heat insulating layer 21 may vary depending on positions on the top surface of the piston main body 19. For example, the thickness of the heat insulating layer 21 provided on the squish area surface 12' may be about half or less the thickness of the heat insulating layer 21 provided on the cavity surface 11'. In this case, it is preferable that the thickness of the heat insulating layer provided on the cavity surface 11' be within the above-described range. On the other hand, the thickness of the heat insulating layer provided on the squish area surface 12' is preferably 15 μm or more and 150 μm or less, more preferably 25 μm or more and 120 μm or less, and especially preferably 30 μm or more and 100 μm or less. With this, even if the cracks are generated on the heat insulating layer 21 on the squish area surface 12' by the generation of the knocking, progress of the cracks can be effectively suppressed.

Method of Forming Heat Insulating Layer

The piston main body 19 and a heat insulating material for forming the heat insulating layer 21 are prepared.

A recess for forming the cavity is formed on the top surface of the piston main body 19, and stains such as oil and fingerprints adhering to the top surface of the piston main body 19 are removed by a degreasing treatment.

Further, the heat insulating material is prepared by stirring and mixing liquid silicone resin as the binder material 32 and glass balloons as the hollow particles 31. Viscosity of the heat insulating material is adjusted by adding a thickener or a dilution solvent according to need.

To increase adhesion force between the piston main body 19 and the heat insulating material, especially the silicone resin, it is preferable that the top surface of the piston main body 19 be subjected to a surface roughening treatment. As the surface roughening treatment, it is preferable to perform a blast treatment such as sand blasting. For example, the blast treatment can be performed by an air blast device using alumina of particle size #30 as a grinding material under treatment conditions that are pressure of 0.39 MPa, a time of 45 seconds, and a distance of 100 mm. However, the surface roughing treatment is not limited to this. In a case where the piston main body 19 is made of an Al alloy, fine irregularities may be formed on the top surface of the piston main body 19 by an alumite treatment. For example, the alumite treatment may be performed by using an oxalic acid bath under treatment conditions that are a bath temperature of 20° C., a current density of 2 A/dm2, and a time of 20 minutes.

After that, the heat insulating layer 21 is formed by applying the heat insulating material to the top surface of the piston main body 19 by using a spray, a brush, or the like (heat insulating layer forming step). Next, the formed heat insulating layer 21 is subjected to predrying by hot-air drying, an infrared heater, or the like.

The above application and predrying of the heat insulating material are repeated (re-application/re-predrying) according to need to obtain a desired application thickness.

Next, a pressure die is pressed against a heat insulating layer 21b of the heat insulating layer 21, the heat insulating layer 21b being provided on the squish area surface (pressure applying step).

Figure 5:
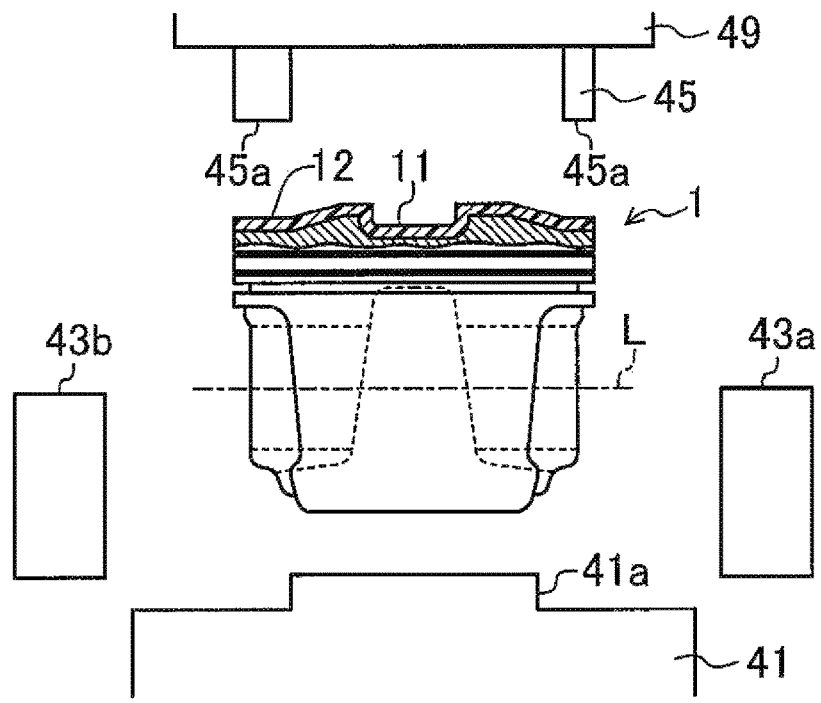
FIG. 5 is a diagram showing a device configured to produce the piston according to the embodiment of FIG. 1.

FIG. 5 shows the configuration of a pressure applying device configured to apply pressure to the heat insulating layer 21b. The pressure applying device includes: a support base 41 supporting the piston main body 19; a light projector 43a and a light receiver 43b which constitute a transmission type laser sensor serving as a position detector; and a pressure die 45.

The support base 41 includes a fitting portion 41a fitted in a spigot joint portion of a piston skirt and firmly supports the piston main body 19. The laser sensor detects a center position L (a position of a central axis L of a piston pin hole) of a piston pin boss of the piston main body 19 supported by the support base 41 and is constituted by the light projector 43a and the light receiver 43b.

The pressure die 45 includes a pressure surface 45a at a lower surface thereof, the pressure surface 45a corresponding to the squish area surface of the piston main body 19. The pressure die 45 is attached to a slider 49 located above the support base 41 and configured to move up and down.

Figure 6:
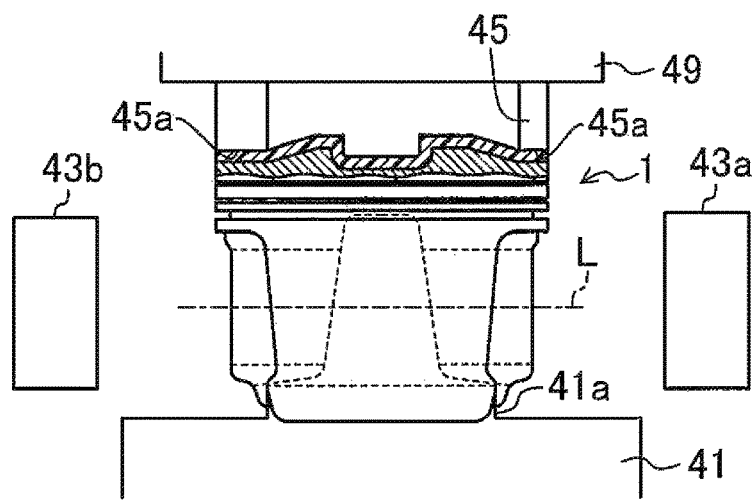
FIG. 6 is a diagram showing a state where pressure is applied to the heat insulating layer by the device of FIG. 5.

As shown in FIG. 6, when forming the heat insulating layer 21, the piston main body 19 is supported by the support base 41 in such a manner that the spigot joint portion of the piston main body 19 is fitted to the fitting portion 41a of the support base 41. The center position L of the piston pin boss of the piston main body 19 is detected by the laser sensors 43a and 43b, and the obtained positional information is input to a drive control portion of the slider 49.

Based on the positional information, a downward stroke of the pressure die 45 is set. Then, the slider 49 moves the pressure die 45 downward by the set stroke. Thus, the pressure surface 45a is pressed against the heat insulating layer 21b provided on the squish area surface of the piston main body 19. At this time, from the viewpoint of improving the strength of the heat insulating layer 21b and effectively suppressing the generation of the cracks, the applied pressure is preferably 0.1 MPa or more and 2 MPa or less, more preferably 0.5 MPa or more and 1.5 MPa or less, and especially preferably 0.8 MPa or more and 1.2 MPa or less.

After the above pressure application treatment, the entire heat insulating layer 21 provided on the top surface of the piston main body 19 is subjected to, for example, a heat treatment at about 180° C. for several hours to several tens of hours. With this, the silicone resin (binder) is cured, and the heat insulating layer 21 in which a large number of hollow particles 31 are densely filled and the binder material 32 is filled in the spaces among the particles is obtained.

As described above, the method of producing the piston 1 according to the present embodiment is characterized in that the pressure application treatment is performed by pressing the pressure die against the heat insulating layer 21b provided on the squish area surface 12' of the piston main body 19, that is, the pressing stress is applied to the heat insulating layer 21b in advance.

According to the present configuration, by applying the pressing stress in advance to the heat insulating layer 21b provided on the squish area surface, resistance of the heat insulating layer 21b to a tensile stress can be increased. Further, even when the knocking occurs at the squish area, the generation of the cracks on the heat insulating layer 21b on the squish area surface 12' can be suppressed.

From the viewpoint of facilitating the pressure application in the pressure applying step, it is preferable that the squish area surface 12' of the top surface of the piston main body 19 be a flat surface.

Other Embodiments

Hereinafter, other embodiments according to the present invention will be explained. In the explanations of these embodiments, the same reference signs are used for the same components as in Embodiment 1, and detailed explanations thereof are omitted.

Figure 7:
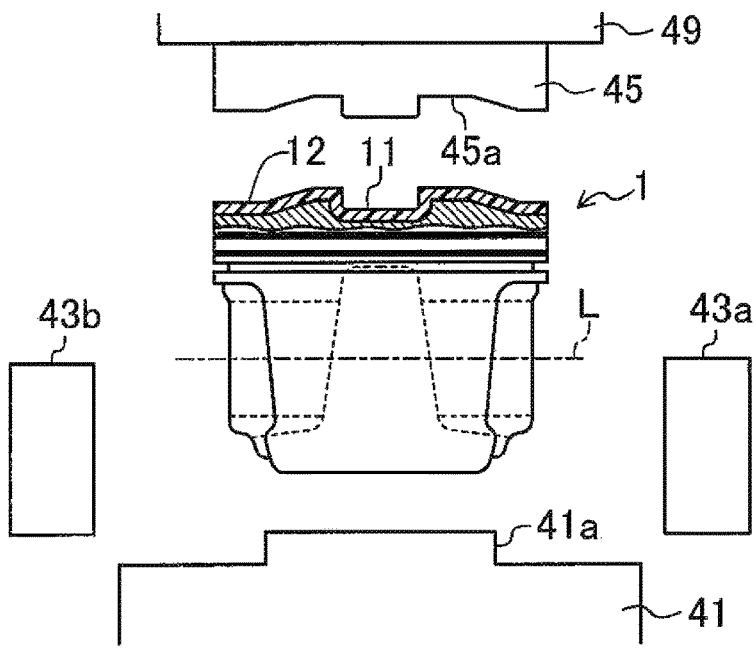
FIG. 7 is a diagram showing a device configured to produce the piston according to another embodiment of the present invention.
Figure 8:
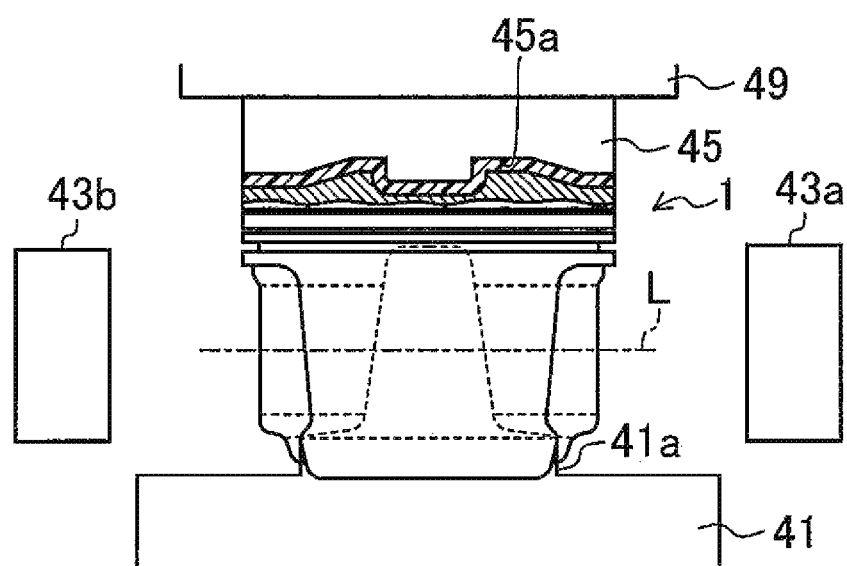
FIG. 8 is a diagram showing a state where pressure is applied to the heat insulating layer by the device of FIG. 7.

FIGS. 7 and 8 are diagrams for explaining another embodiment of the method of producing the piston.

As shown in FIG. 7, the pressure die 45 includes the pressure surface 45a covering the entire heat insulating layer 21 so as to be able to apply pressure to not only the heat insulating layer 21b provided on the squish area surface 12' of the piston main body 19 but also the heat insulating layer 21a.

According to the present configuration, since the pressure application treatment can be performed with respect to the entire heat insulating layer 21, the entire heat insulating layer 21 becomes resistant to the tensile stress, and the generation of the cracks can be more effectively suppressed.

Further, in the case of using the pressure die 45, instead of forming the heat insulating layer 21 in advance, the heat insulating layer 21 may be formed by the pressure die 45 in such a manner that: the heat insulating material is supplied onto the top surface of the piston main body 19; and the heat insulating material is pressed by the pressure die 45 to spread on the top surface. In this case, after the above formation, the pressure die 45 performs the pressure application to achieve the pressure application treatment. Thus, the process of producing the piston 1 may be simplified.

As another embodiment, at the same time as or after the pressure application treatment by the pressure die 45, the pressure die 45 may be heated to bake the heat insulating layer 21. Thus, the process of producing the piston 1 may be simplified.

Further, the silicone resin of at least a part of the surface of the heat insulating layer 21 is oxidized by the baking. Thus, the strength of the heat insulating layer 21 can be improved, and the generation of the cracks can be effectively suppressed.

In the case of the baking performed by heating the pressure die 45, heat is transferred from a surface of the heat insulating layer 21 which surface contacts the pressure die 45. Therefore, a temperature gradient is generated in the heat insulating layer 21 in a direction from the surface of the heat insulating layer 21 toward the top surface of the piston main body 19. On this account, by adjusting the temperature of the pressure die 45, the strength of the heat insulating layer 21 can be improved by oxidizing the silicone resin of at least a part of the surface of the heat insulating layer 21, and the adhesion between the top surface of the piston main body 19 and the heat insulating layer 21 can be maintained by maintaining the silicone resin inside the heat insulating layer 21.

As above, in the case of baking the heat insulating layer 21 by the pressure die 45, the piston main body 19 may be cooled by, for example, a method of performing water cooling or air cooling from an inside of the piston skirt. With this, the above-described temperature gradient in the heat insulating layer 21 becomes large, that is, a temperature increase of the silicone resin inside the heat insulating layer 21 can be effectively suppressed. Therefore, the adhesion between the heat insulating layer 21 and the top surface of the piston main body 19 can be improved.

INDUSTRIAL APPLICABILITY

According to the present invention, while forming the heat insulating layer on the squish area surface of the top surface of the piston main body, the generation of large cracks on the heat insulating layer can be prevented, and the damages and peeling of the heat insulating layer can be suppressed. Therefore, the present invention is extremely useful.

LIST OF REFERENCE CHARACTERS

1 piston
11' cavity surface
12' squish area surface
19 piston main body
21, 21a, 21b heat insulating layer
31 hollow particle
32 binder material (binder)
45 pressure die
E engine

The invention claimed is:

1. A method of producing a piston for an engine, a heat insulating layer being provided on an entirety of a top surface of a piston main body of the piston, wherein the heat insulating layer includes:
   a plurality of hollow particles; and
   a binder that holds the hollow particles on the top surface of the piston main body and fills spaces among the hollow particles to form a base material of the heat insulating layer,
   the method comprising:
      a heat insulating layer forming step of placing a heat insulating material including the hollow particles and the binder on the entirety of the top surface of the piston main body to form the heat insulating layer; and
      a pressure applying step of applying pressure to the heat insulating layer,
   wherein:
      the top surface of the piston main body includes a squish area surface forming a squish area; and
      in the pressure applying step, the pressure is applied only to the heat insulating layer provided on the squish area surface.

2. The method according to claim 1, wherein the squish area surface is a flat surface.

3. The method according to claim 1, wherein in the pressure applying step, baking of the heat insulating layer is performed at the same time when the pressure is applied to the heat insulating layer.

4. The method according to claim 2, wherein in the pressure applying step, baking of the heat insulating layer is performed at the same time when the pressure is applied to the heat insulating layer.

5. The method according to claim 3, wherein:
   the binder is silicone-based resin; and
   the silicone-based resin of at least a part of a surface of the heat insulating layer is oxidized by the baking.

6. The method according to claim 4, wherein:
   the binder is silicone-based resin; and
   the silicone-based resin of at least a part of a surface of the heat insulating layer is oxidized by the baking.

7. The method according to claim 5, wherein in the pressure applying step, cooling of the piston main body is performed at the same time as the baking.

8. The method according to claim 6, wherein in the pressure applying step, cooling of the piston main body is performed at the same time as the baking.

9. The method according to claim 1, further comprising, before the heat insulating layer forming step, a step of subjecting the top surface of the piston main body to a surface roughening treatment.

* * * * *